United States Patent [19]

Hsu et al.

[11] Patent Number: 4,828,852
[45] Date of Patent: May 9, 1989

[54] PREPARATION OF PASTA

[75] Inventors: Jau Y. Hsu, Brookfield; Gary J. Larson, New Milford; Elaine R. Wedral, Sherman, all of Conn.

[73] Assignee: Nestec S.A., Vevey, Switzerland

[21] Appl. No.: 173,714

[22] Filed: Mar. 25, 1988

[51] Int. Cl.$^4$ ............................ A21L 1/16; A23P 1/08
[52] U.S. Cl. ...................................... 426/94; 426/274; 426/302; 426/542; 426/557
[58] Field of Search ................. 426/94, 274, 302, 542, 426/557

[56] References Cited

U.S. PATENT DOCUMENTS 4,552,772 11/1985 Saitoh et al. ..................... 426/557
4,763,570 8/1988 Bellanca ............................ 426/509

FOREIGN PATENT DOCUMENTS 2502907 10/1982 France .

*Primary Examiner*—Donald E. Czaja
*Assistant Examiner*—Helen Pratt
*Attorney, Agent, or Firm*—Vogt & O'Donnell

[57] ABSTRACT

A process for the preparation of a precooked pasta product which comprises boiling a raw pasta in acidified water to partially cook the pasta, soaking the partially cooked pasta in acidified water, the cooking and soaking conditions being chosen to give the soaked, partially cooked pasta a pH of from 3.8 to 4.3 and a moisture content of from 61% to 68%, the soaking time being sufficient to enable the partially cooked pasta to absorb a further 3% to 7% water after boiling, coating with acidified cream having a milk fat content from 20% to 40% by weight based on the weight of cream, flush packaging with an inert gas or vacuum packaging, sealing and finally heat processing to complete the cooking.

12 Claims, No Drawings

PREPARATION OF PASTA

The present invention relates to a process for the preparation of a precooked pasta product suitable for rapid preparation for consumption.

Commercial pasta products may be classified into two categories, viz. dehydrated and "wet" pastas. "Wet" pastas can be uncooked, partially cooked (pasteurised), fully cooked or sterilised. However, sterilised pastas such as canned pastas usually have a less than desirable texture owing to the severe heat processing.

Although partially cooked (pasteurised) pastas with adequate packaging protection, such as $CO_2/N_2$ or $N_2$ controlled atmosphere packaging, can have storage life of up to 6-8 weeks in refrigerated conditions (about 2°-8° C.), it is not commercially feasible to store such products at room temperature. On the other hand, fully cooked pastas can only be kept at room temperature for substantial periods of time if they are preserved and protected, for example, by acidification, reduction of water activity, preservation by materials such as hydrogen peroxide, chlorine dioxide, alcohol, hydrogen sulphide, potassium sorbate etc., or vacuum or controlled atmosphere packaging. However, in view of the possible adverse effects on human health of some preservatives such as hydrogen peroxide, the use of artificial preservatives is not desirable.

One method of preparing a precooked pasta product suitable for rapid cooking without using artificial preservatives is described and claimed in U.S. Pat. No. 4552772. This process comprises boiling the pastas and washing said boiled pastas with water, the improvement comprising immersing the boiled pastas in an aqueous solution containing (a) at least one of citric acid and lactic acid and (b) table salt, then packaging and heat sterilising the pastas which have been immersed, said aqueous solution having a pH such that the pH of the boiled pastas, after immersion, is about 3.9 to about 4.3.

However, when prepared by the process of U.S. Pat. No. 4552772 the pasta pieces tend to stick together after heat processing and are difficult to separate, which is not convenient for consumption.

French Patent Application, Publication No. 2502907 describes a process for the production of a precooked pasta product which comprises treating a raw pasta product in the following stages:
1. Precooking, preferably in acidulated water to give the product a moisture content sufficient for subsequent sterilisation,
2. Cooling, preferably in a current of cold, acidulated water,
3. Draining off excess water,
4. Oiling with a vegetable oil e.g. by vapourisation,
5. Introducing into a flexible container,
6. Reduction and uniformisation of thickness,
7. Sealing in the containers in vacuum,
8. Heat sterilisation of sealed containers.

The use of the vegetable oil prevents the pasta pieces sticking together but, as a result the pastas have an oily appearance and owing to the sterilisation treatment, they have a less than desirable texture.

We have devised a process for preparing precooked pasta products suitable for rapid preparation for consumption which do not stick together, do not have an oily appearance, have a desirable texture and are shelf stable for long periods at ambient temperature.

Accordingly, the present invention provides a process for the preparation of a precooked pasta product which comprises boiling a raw pasta in acidified water to partially cook the pasta, soaking the partially cooked pasta in acidified water, the cooking and soaking conditions being chosen to give the soaked partially cooked pasta a pH of from 3.8 to 4.3 and a moisture content of from 61% to 68%, the soaking time being sufficient to enable the partially cooked pasta to absorb a further 3% to 7% water after boiling, coating with acidified cream having a milk fat content from 20% to 40% by weight based on the weight of the cream, flush packaging with an inert gas or vacuum packaging, sealing and finally heat processing to complete the cooking.

The process of this invention is suitable for the production of all kinds of pastas whether produced by an extruding or sheeting method, and the flour used may be, for example, Semolina wheat, Durum wheat, wheat flour, whole wheat flour, corn flour, pre-gelatinized corn flour, rice flour, waxy rice flour, pre-cooked rice flour, potato flour, pre-cooked potato flour (potato flake), lentil flour, pea flour, soy flour, farina, white and red bean flours (kidney and pinto bean), Mung bean flour, corn starch, wheat starch, rice starch, potato starch, pea starch etc. If desired, other materials conventionally used in making pastas may be added to the flours.

The amount of water mixed with the flour and any other ingredients present is conveniently from 17.5% to 30% and preferably from 20% to 28% by weight based on the weight of the flour and water. The optimum amount of water depends on the type of flour. For example, for fine Durum wheat, the amount of water is preferably from 24% to 28% by weight while for coarse Semolina wheat the amount of water is preferably from 20% to 24% by weight, based on the weight of the flour and water.

The flour and water and any other ingredients present may be mixed into the dough by using any conventional mixer which can ensure complete mixing of flour and water leaving substantially no flour unmixed, for instance, a Hobart mixer or the mixing compartment attached to most pasta extruders.

The process of the present invention is especially suitable for pastas prepared by extrusion, for instance, through a regular pasta extruder and is applicable to pastas of various shapes or thicknesses such as spaghetti, elbow macaroni, spirals linguine or shells. Conveniently, the thickness may vary from 0.5 to 2.5 mm and preferably from 1.0 to 2.0 mm.

The boiling and soaking times are determined by the pasta thickness and the concentration of the acid used in the aqueous solution and the conditions can readily be determined by the ordinary person skilled in the art. Generally, in order to obtain the required pH and moisture content, longer cooking and soaking times are required for thicker pastas and for lower acid concentrations while shorter cooking and soaking times are adequate for thinner pastas and higher acid concentrations. The amount of water used in the boiling and soaking steps may be conventional, for example, from 10 to 20 parts by weight of water per part by weight of pasta.

The soaked partially cooked pasta has a pH preferably from 3.9 to 4.2, especially from 3.95 to 4.15 and a moisture content preferably from 62% to 67% and especially from 62.5% to 66.5%. The soaking time is preferably sufficient to enable the partially cooked pasta to absorb a further 4% to 6% water after boiling and especially a further 4.5% to 5.5% water after boiling. The soaking time is related to the thickness of the pasta and is usually at least 1 minute, preferably from 1.5 to 10 minutes, more preferably from 3 to 8 minutes and especially from 4 to 7 minutes. The soaking time required to enable the pasta to absorb the desired further amount of water after boiling is shorter for thinner pastas than for thicker pastas. The temperature at which the soaking takes place may be conventional, for example from 4° C. to 25° C. Ambient temperatures are convenient.

The acid used in the aqueous medium either for boiling or soaking may be any food-acceptable acid, for instance, acetic, malic, fumaric, tartaric, phosphoric or adipic acid, but is preferably lactic or citric acid.

After soaking, the soaked partially cooked pasta is preferably drained of excess water. The pasta is then coated with acidified cream conveniently in an amount from 1–10% preferably from 2–8% and especially from 3–6% by weight based on the weight of the soaked partially cooked pasta.

The cream used in this invention may be a light cream, a light whipping cream or a heavy cream containing at least 20% milk fat and generally from 20% to 40% by weight milk fat based on the weight of the cream. The term "cream" should also be understood to include any source of milk fat appropriately blended to make an emulsion containing at least 20% by weight of milk fat. Preferably the cream used is a heavy cream which generally contains from 36% to 40% by weight of milk fat based on the weight of the cream.

The acidified cream preferably has a pH from 4.0 to 4.6 and especially from 4.1 to 4.4. The acidification can be carried out by adding any food-acceptable acid such as citric, acetic, malic, fumaric, tartaric, phosphoric, adipic or lactic acid in a suitable amount, for example from 0.25 to 0.75% by weight and preferably from 0.4 to 0.6% by weight based on the weight of cream. The acidification of the cream not only imparts better shelf life but also thickens the cream for better coating ability.

Advantageously, a natural or synthetic food-acceptable antioxidant may be added to the heavy cream. Examples of natural antioxidants are rosemary extract, tocopherol and tea extract. Examples of synthetic antioxidants are butylated hydroxyanisole (BHA), butylated hydroxytoluene (BHT) and propyl gallate (PG). For example, rosemary extract may be used in an amount of from 250 to 1,250 ppm and preferably from 500 to 1,000 ppm based on the fat content of the heavy cream.

The flush packaging of the coated pasta may be carried out in a rigid container e.g. a metal container, or a flexible container such as a pouch. After filling with pastas, the container is flushed with an inert gas such as nitrogen or a mixture of carbon dioxide and nitrogen, and then sealed.

Finally the pastas are heat-processed to complete the cooking at a temperature from 80° C. to 110° C. for a period of from 15 to 60 minutes and preferably from 90° C. to 100° C. for a period of from 20 to 40 minutes. Advantageously, when packaging in a pouch, the heat-processing is carried out with an over-riding pressure, conveniently from 0.5 to 1 bar to prevent swelling of the pouch. The pH of the pasta increases during heat processing to a value from 4.0 to 4.5 and preferably to a value from 4.1 to 4.4.

For consumption, the pouches may either be pierced and placed in a microwave oven and heated for 1–2 minutes at high power, or they may be placed in boiling water for about 5–7 minutes.

The pastas have an appealing creamy appearance, not oily, have a good texture and flavour and do not stick together. Storage tests showed that the pastas were microbiologically safe and organoleptically acceptable after 1 year at 21° C.

The following Examples further illustrate the present invention.

EXAMPLES 1–5

A pasta dough was prepared from 78.5% Durum Semolina wheat and 21.5% water and pastas with various shapes and thicknesses were prepared by extruding through a regular pasta extruder. The pasta shapes and thicknesses are indicated in Table I below. 800 g of each pasta were boiled in 12 liter of water containing lactic acid (88% strength) in the concentrations indicated in Table I so that the acidified water had a pH of 3, and then soaked in water acidified with lactic acid (88% strength) to a pH of 3 at ambient temperature so that the pasta absorbed a further 5% water, the cooking and soaking times and the moisture content and pH of the soaked pastas after heat processing being indicated in Table I below.

TABLE I

| EXAMPLE | PASTAS | PASTA THICKNESS | LACTIC ACID CONCENTRATION | COOKING & SOAKING TIME | % MOISTURE | pH |
|---|---|---|---|---|---|---|
| 1 | Spaghetti | 2.0 mm | 0.25% | 6 min each | 65.7 | 4.30 |
| 2 | Elbow Macaroni | 1.25 mm | 0.25% | 5 1/2 min each | 63.9 | 4.20 |
| 3 | Spiral | 1.0 mm | 0.17% | 4 1/2 min each | 63.3 | 4.20 |
| 4 | Linguine | 1.25 mm | 0.28% | 5 min each | 66.0 | 4.26 |
| 5 | Shell | 1.25 mm | 0.33% | 2 min each | 65.0 | 4.34 |

After the soaking step the pastas were drained of excess water and coated with 4% by weight based on the weight of pasta of acidified heavy cream having a pH of 4.2 containing lactic acid and rosemary extract. In the preparation of the acidified heavy cream, to 99.9% heavy cream was added a mixture consisting 0.03% rosemary extract and 0.07% ethanol. To this mixture was added 0.5% by weight of lactic acid based on the weight of the heavy cream mixture.

The pastas coated with heavy cream were then packaged in a 150 g pouch made of nylon/high barrier co-ex/linear low density polyethylene. After filling, the pouches were flushed with nitrogen, sealed and then heat processed at 96° C. (inside temperature of pastas in the pouch) for 30 minutes in a retort with an over-riding pressure of 1 bar.

The pastas had an appealing creamy appearance, were not oily, had a good texture and flavour and they did not stick together.

The test results are as follows:

A. Microbiological test results
  1. 12 months/70° F. storage condition colony forming units/gram

| Total Aerobes | Lactobacilli | Yeast and Mold | | |
|---|---|---|---|---|
| Less than 10 | Less than 10 | Less than 10 | | |
| 2. 6 months/100° F. storage condition colony forming units/gram | | | | |
| Total Aerobes | Mesophilic Sporeformers | *Bacillus Cereus* | *Staphyloccous Aureus* | Yeast & Mold |
| Less than 100 | Less than 100 | Less than 100 | Less than 100 | Less than 100 |

B. Organoleptical Test Results
  1. 12 months/70° F. storage condition
     Color and flavor were good, pastas were not brownish and no rancid flavor.

COMPARATIVE EXAMPLE A

The process of Example 1 was repeated but without using acidified heavy cream. A panel of 27 expert tasters showed no preference for the taste of the acidified pasta with or without a coating of acidified heavy cream (14 votes for the control and 13 votes for the sample with acidified heavy cream added). This shows that the coating with acidified heavy cream does not further increase the acidic taste of the pasta.

COMPARATIVE EXAMPLE B

The process of Example 1 was repeated but using corn oil rather than acidified heavy cream for coating the pastas. The sample coated with corn oil had an unattractive oily appearance and a panel of 27 tasters showed a preference for the sample coated with acidified heavy cream.

COMPARATIVE EXAMPLE C

The process of Example 1 was repeated except that there was no nitrogen flushing of the pouch during packaging. Samples prepared without nitrogen flushing had only 1 month shelf life during storage at 38° C. compared with 3 months for the product of Example 1. In addition, samples prepared without nitrogen flushing had a rancid taste and their colour turned pale at first and then brownish while the product of Example 1 had an excellent taste and retained to attractive colour.

COMPARATIVE EXAMPLE D

The process of Example 1 was repeated except instead of boiling and soaking for 6 minutes each, the pasta was boiled for 8 minutes to obtain a similar moisture content of 65.7% followed by a short rinsing step. This extra 2 minutes of boiling in acidified water solution resulted in a pasta with a mushy texture.

COMPARATIVE EXAMPLE E

The process of Example 1 was repeated except that the soaking step was omitted. Owing to the lower moisture content because of the absence of a soaking step, the pasta had an undesirable "stringy" texture.

We claim:

1. A process for the preparation of a precooked pasta product which comprises boiling a raw pasta in acidified water to partially cook the pasta, soaking the partially cooked pasta in acidified water, the cooking and soaking conditions being chosen to give the soaked, partially cooked pasta a pH of from 3.8 to 4.3 and a moisture content of from 61% to 68%, the soaking time being sufficient to enable the partially cooked pasta to absorb a further 3% to 7% water after boiling, coating with acidified cream having a milk fat content from 20% to 40% by weight based on the weight of cream, flush packaging with an inert gas or vacuum packaging, sealing and finally heat processing to complete the cooking.

2. A process according to claim 1 wherein the acid used in the aqueous solution for boiling or soaking is lactic, citric, acetic, malic, fumaric, tartaric, phosphoric or adipic acid.

3. A process according to claim 1 wherein the soaked, partially cooked pasta is drained of excess water.

4. A process according to claim 1 wherein the amount of acidified cream used to coat the pasta is from 2% to 8% by weight based on the weight of the soaked partially cooked pasta.

5. A process according to claim 1 wherein the cream used is a heavy cream containing from 36% to 40% by weight milk fat based on the weight of the cream.

6. A process according to claim 1 wherein the acidified cream has a pH of from 4.0 to 4.6.

7. A process according to claim 1 wherein the acidified cream contains from 0.25% to 0.75% lactic acid by weight based on the weight of the cream.

8. A process according to claim 1 wherein the acidified cream contains a natural antioxidant.

9. A process according to claim 8 wherein the amount of antioxidant is from 250 to 1,250 ppm based on the fat content of the cream.

10. A process according to claim 8 wherein the natural antioxidant is rosemary extract, tocopherol or tea extract.

11. A process according to claim 1 wherein the heat processing is carried out at a temperature from 80° C. to 110° C. for a period of 15 to 60 minutes.

12. A process according to claim 11 wherein, when packaging in a pouch, the heat processing is carried out with an over-riding pressure to prevent swelling of the pouch.

* * * * *